Patented Sept. 7, 1948

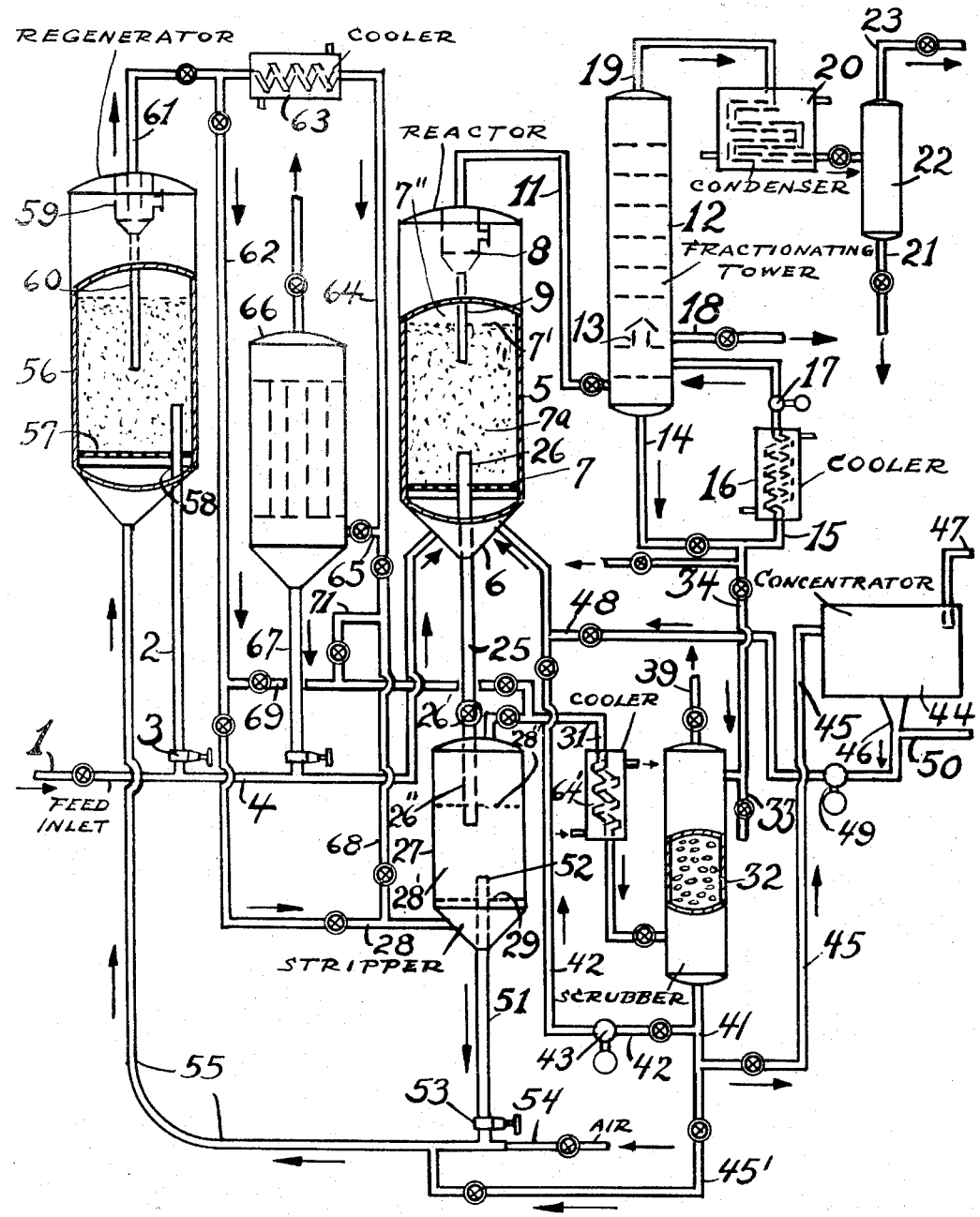

2,449,027

UNITED STATES PATENT OFFICE 2,449,027

CONVERSION OF HYDROCARBON OILS

Alexis Voorhies, Jr., East Baton Rouge, La., assignor to Standard Oil Development Company, a corporation of Delaware Application June 4, 1946, Serial No. 674,342

11 Claims. (Cl. 196—52)

1

This invention relates to the conversion of hydrocarbon oils and is concerned more particularly with the conversion of such oils in the presence of a finely divided catalytic material.

One method of cracking oils now being employed is to pass the oil to be cracked to a cracking zone containing a body of finely divided catalytic material. During the passage of the oil vapors through the catalyst body a small portion of the catalyst becomes entrained in the reaction vapors leaving the top of the reaction zone. This entrained catalytic material normally appears in the initial condensate formed in the bottom of the product fractionator. In order to recover this catalyst and return it to the conversion process it is the practice to recycle this initial fraction containing the entrained catalyst to the conversion zone. The initial condensate formed in the product fractionator, however, forms a very poor cracking stock in that it produces an excessive amount of coke or carbon deposits in proportion to the amount of gasoline obtained therefrom.

The process also involves continuous circulation of the finely divided catalytic material through the cracking zone and a regenerating zone. In the regeneration zone combustible deposits formed on the catalyst during the cracking process are burned by passing a stream of air or oxidizing gas through the regeneration zone. As a result a small amount of the finely divided catalytic material also becomes entrained in the combustion gases leaving the regeneration zone. This catalyst is normally recovered by passing the spent combustion gases through suitable dust recovery equipment such as electrical precipitators. The catalyst recovered in the dust recovery equipment is returned to the cracking or regeneration zone. Another step in the process is to strip or purge the catalyst removed from the cracking zone to recover valuable hydrocarbons absorbed or associated with the catalyst which would otherwise pass through the regeneration zone and be burned or destroyed therein.

Steam forms the cheapest and most available gas for effecting the stripping of the valuable hydrocarbons from the catalytic material but it has been found in some cases, such as when employing silica-alumina gels, that the presence of steam in the regeneration zone tends to impair the activity of the catalyst.

One of the primary objects of this invention is to provide a method of recovering catalytic material entrained in the regeneration gas. Another object of the invention is to provide an improved method of removing the valuable hydrocarbons from the catalytic material withdrawn from the cracking zone.

An additional object of the invention is to provide a more effective method of recovering catalyst entrained in the cracked vapors passing to the product fractionating tower.

2

Other objects and advantages of the invention will be apparent from the more detailed description hereinafter in which reference will be made to the accompanying drawing which is a diagrammatic illustration of an apparatus capable of carrying the invention into effect.

In accordance with the present invention, a part or all of the regeneration gases removed from the regeneration zone are utilized for stripping or removing valuable constituents contained on the catalyst withdrawn from the cracking zone.

The presence of a small amount of free oxygen in the spent regeneration gas used for stripping may cause limited combustion of carbonaceous deposits associated with the catalyst within the stripping zone. A small rise in temperature within the stripping zone as a result of the combustion produces more efficient stripping of vaporizable constituents within the stripping zone. In such cases, the stripping zone may serve as a preliminary regenerator in which a small amount of regeneration is obtained by the limited amount of free oxygen contained in the spent regeneration gas from the main regeneration zone.

In other cases the spent regeneration gas employed for stripping may be substantially free of oxidizing gas.

The regeneration gas after passing through the stripping zone wherein the valuable hydrocarbons are removed is then passed through an absorbing or scrubbing zone in which the stripping gases are contacted with an oil to recover the valuable oil constituents removed from the catalyst and to also recover catalyst entrained in the stripping gas removed from the stripping zone.

According to a specific embodiment of the invention, the stripping gas employed for removing valuable hydrocarbons from the spent catalyst withdrawn from the cracking zone is contacted with a slurry of oil and catalyst. This slurry preferably comprises the initial condensate formed in the bottom of the product fractionator and contains the catalyst entrained in the cracked vapors entering the fractionator.

Referring now to the drawing, the reference character 1 designates a feed line through which the oil to be cracked is introduced into the equipment. This oil may be any suitable hydrocarbon fraction, such as a gas oil or a topped or reduced crude. The oil prior to being introduced through line 1 may be preheated to a temperature approaching the final desired cracking temperature or the oil may be relatively cool and the heat required for the cracking process supplied by the introduction of hot catalytic material as later described.

The oil passing through line 1 meets a stream of hot freshly regenerated catalytic material passing through line 2 having a control valve 3 for regulating the amount of catalytic material introduced into the oil stream.

The catalyst employed for the cracking operation may be any type suitable for accomplishing the cracking process. The most common catalyst employed for this purpose at the present time comprises a siliceous material containing alumina, such as activated clays and mixed synthetic gels of silica and alumina. The catalyst is preferably in a finely divided state in which the major portion of the material has a particle size finer than 200 mesh. The amount of catalyst introduced into the oil stream may vary over an extended range depending upon the results desired, and the type of feed stock employed. In cases where the oil passing through line 1 is relatively cool and the heat necessary for the cracking process is supplied primarily by the heat of the catalyst introduced into the oil stream, the amount of catalyst so introduced will be determined by the difference in temperature between the cracking treatment and the regenerative treatment.

The mixture of oil vapors and catalyst formed at the juncture of the line 1 and pipe 2 is passed through line 4 into the bottom of a cracking chamber 5. The cracking chamber 5 may have an inverted conical bottom section 6 as illustrated and a perforated grid plate 7 positioned thereabove through which the suspension passes into the main portion of the cracking chamber. The space below the perforated grid 7 forms a distributing zone for distributing the suspension uniformly over the full cross-sectional area of the reaction chamber.

The velocity of the oil vapors passing upwardly through the cracking chamber 5 is preferably controlled to permit the bulk of the catalytic material to segregate into a relatively dense fluidized turbulent layer 7a in the bottom portion of the reaction chamber having a level 7' as shown. The velocity for accomplishing this will depend upon the size and density of the catalyst particles. In general, the superficial velocity of the oil vapors through the reaction zone will be of the order of from .5 to 5 feet per second and preferably between 1 and 2 feet per second. Under the above conditions the dense layer may contain from 10 to 30 pounds of catalyst per cubic foot.

The depth of the layer of catalytic material in the cracking chamber 5 is controlled to provide the desired contact time between the oil vapors and catalyst. In general, this contact time may be of the order of from 5 seconds to a minute or more depending upon the activity of the catalyst, the temperature, the degree of conversion desired and other factors. The temperature within the cracking chamber may be maintained between 800 and 1100° F., usually between 900° and 1000° F.

The reaction chamber 5 is preferably constructed of such height as to provide a substantial free space 7'' above the layer of catalytic material therein and in order to reduce the amount of catalyst entrained in the reaction products removed from the cracking chamber.

The cracked vapor products after passing through the reaction chamber 5 may be passed to a cyclone separator 8 or other suitable separating device for separating the bulk of the entrained catalyst particles therefrom. As illustrated, the cyclone separator 8 is positioned in the top of the reaction chamber 5. It will be understood, however, that the separator may be positioned outside of the chamber and other types of separating equipment may be used in place of the cyclone separator.

The catalyst separated in the separator 8 is returned to the reaction chamber through line 9 extending into the dense bed 7a to below level 7'.

The reaction products, after passing through the cyclone separator 8, are withdrawn therefrom through line 11 and are passed to a fractionating tower 12 in which they are subjected to fractionation to segregate the products into the desired fractions. The initial condensate formed in the bottom section of the fractionating tower 12 will contain a small amount of entrained catalyst which is not removed in previous separating equipment. The fractionating tower 12 is preferably provided with a trap-out tray 13 for segregating the initial condensate from the lighter cycle oil. This initial condensate may comprise, for example, from 5 to 15% of the total condensate formed in the tower.

The condensate formed in the bottom portion of the fractionating tower is removed therefrom through line 14. A portion of the condensate may be passed through line 15, heat exchanger 16 and pump 17 to the fractionating tower above the point of entry of the gaseous products there to serve as a cooling and reflux medium for scrubbing the catalyst from the oil vapors.

According to one phase of the present invention, a portion of this initial condensate containing entrained catalyst is utilized for contacting stripping gas as later described.

Condensate formed in the upper portion of the fractionating tower may be withdrawn from the tray 13 through line 18.

While the single fractionating tower having a trap-out tray has been shown for effecting the segregation of the low boiling cycle oil from the higher boiling condensate fraction, it will be understood that this separation may be accomplished in separate towers or the initial condensate may be formed in a condensor.

Gases and vapors remaining uncondensed in the fractionating tower 12 are withdrawn therefrom through line 19 to a condenser 20 in which normally liquid constituents are condensed.

The products from the condenser 20 are then passed to a product receiver 22 in which the normally gaseous constituents are separated from the liquid distillate.

The uncondensed gases are removed from the product receiver 22 through line 23 and may be passed to suitable gas absorption equipment or other apparatus for recovering valuable constituents therefrom. The liquid distillate is removed from the product receiver 22 through line 21. This product may be subjected to further finishing treatment, such as distillation, acid treatment, or clay treatment, for producing the final market product.

Referring again to the reaction chamber 5, the lower portion thereof communicates with a vertical tube or conduit or standpipe 25 which has an extension 26 projecting into the interior of the reaction chamber 5 and into the lower portion of the dense turbulent catalyst mixture 7a above the perforated grid 7. This conduit serves to withdraw catalytic material in a dense fluidized condition from the dense turbulent mixture 7a in the cracking chamber. The conduit or tube 25 is provided with a valve 26' and has its lower end 26'' projecting downwardly into a stripping chamber 27 in which the catalyst withdrawn from the cracking chamber is subjected to stripping treatment to remove vaporizable hydrocarbons contained thereon. Fluidizing gas may be introduced into standpipe 26. The catalyst passing into the stripping chamber 27 is contacted with a stream of regeneration gas introduced through line 28. As illustrated, the stripping chamber 27 is of construction similar to the reaction chamber 5. The base of the chamber is in the form of an inverted cone above which is a perforated grid 29 through which the regeneration gas from line 28 passes into the stripping chamber 27 for contact with the catalyst contained therein. The regeneration gas introduced through line 28 serves to strip the vaporizable constituents from the spent catalyst withdrawn from the cracking chamber.

The velocity of the stripping gas passing upwardly through the stripping chamber 27 is also controlled to permit the bulk of the catalyst to segregate into a dense fluidized turbulent layer 28' in the bottom portion of the chamber having a level indicated at 28". The linear velocity of this gas would be of the same order of magnitude as the velocity of the oil vapors passing through the reaction chamber 5. The lower end 26" of pipe or conduit 25 extends into the dense mixture 28' in stripping chamber 27 below the level 28" therein so that the dense fluidized mixture is conducted from chamber 5 through pipe 25 into the dense mixture 28' in stripping chamber 27.

The stripping gas containing entrained catalyst and constituents vaporized from the catalyst within the stripping chamber 27 is removed from the chamber through line 31 and is introduced into a scrubbing or absorption tower 32 in which it contacts an oil introduced through line 33. The stripping gas and stripped-out material leaves stripping chamber 27 as a separate stream through line 31 and does not pass up through reaction chamber 5. This oil may comprise a part or all of the condensate withdrawn from the bottom of the product fractionator 12. In such cases the condensate passes through lines 14 and 34 which merge with line 33 leading to the upper section of the tower 32.

The tower 32 may contain packing elements, such as porcelain chips, ceramic materials, baffles, and the like, or it may be an unobstructed chamber through which the liquid passes countercurrent to the stripping gas. The temperature of the scrubbing tower 32 will depend upon the boiling point of the oil used as a scrubbing agent therein. When the initial condensate from the bottom of the product fractionator 12 is employed, the temperature is maintained below 400° F. and preferably below 200° F. The stripping gas after passing through the tower 32 is vented to the atmosphere through line 39. This product will be substantially free of catalyst particles. The gases vented through line 39 may contain a small amount of oil vapors. When employing slurry oil from the bottom of the fractionating tower as a scrubbing medium such vapors are of little value in the cracking operation. If desired, these gases may be passed to suitable recovery equipment for removal of the oil vapors before exhausting the gases to the atmosphere.

A slurry of oil and catalyst is withdrawn from the tower 32 through line 41. This product may be passed directly through line 42 and pump 43 to the reaction chamber 5. When desired, a portion of this product may be passed through line 45' and line 55 into the regenerator 56. In some cases it may be desirable to pass the slurry to the concentrator 44 through line 45.

The concentrator 44 may be in the form of a thickener, settler, filter, centrifuge, or the like, designed to reduce the amount of oil contained in the slurry or to increase the concentration of catalyst therein.

The clear oil produced from the slurry in the concentrator 44 is withdrawn from the top through line 47 and is discharged from the system. The concentrated slurry is withdrawn from the bottom of the thickener or other suitable concentrating device through line 46. A portion of the fresh feed is introduced through line 50 and mixed with the slurry which may then be returned to the reaction chamber.

Referring again to the stripping chamber 27, a vertical tube or conduit 51 connects with the bottom thereof. This conduit has an extension 52 projecting upwardly into the dense fluidized mixture 28' in the interior of the stripping chamber 27 through the perforated grid 29. The stripped catalyst in dense fluidized condition is withdrawn from the stripping chamber 27 through the conduit 51 and is discharged at a controlled rate through valve 53 into a stream of air passing through line 54. The mixture of air and catalyst is then transferred through line 55 to the bottom of a regenerating chamber 56. The base of this chamber is also in the form of an inverted cone having a perforated grid 57 through which the suspension passes into the main portion of the regeneration chamber. The velocity of the regeneration gas passing upwardly through the chamber 56 is also preferably controlled to permit the catalyst to segregate into a dense layer which is maintained in a state of constant turbulence by the upward passage of the gas therethrough. This velocity will be of the same order of magnitude as the velocity of the stripping gas and oil vapors passing through chambers 27 and 5, respectively. The catalyst is regenerated in the chamber 56 by burning combustible deposits which are formed thereon during the cracking treatment. The vertical tube 2 previously mentioned serves to withdraw the catalyst from the regeneration chamber and to return the catalyst to the oil stream. This tube preferably has an extension 58 projecting into the interior of the regenerator 56 as illustrated. The regeneration gas after passing through the regeneration chamber 56 may be passed to a cyclone separator 59 or other suitable separating equipment for removal of entrained catalyst therefrom. The catalyst so separated is returned to the regenerator 56 through line 60.

The regeneration gas is removed from the separator 59 through line 61. According to one phase of the present invention, a part or all of the gas so removed is passed through line 62 which merges with line 28 leading into the base of the stripping tower 27 so that the regeneration gas is used as a stripping medium. In general, it is desirable to employ only a relatively small portion of the spent regeneration gas as a stripping agent in the stripping chamber 27. In the latter case the main stream of regeneration gas may be passed to a heat exchanger 63 wherein it is cooled to a temperature below 700° F. and preferably below 500° F. The cooled gas is then passed through line 64 and 65 to an electrical precipitator 66 or other suitable separating device for removing the entrained catalyst powder therefrom. The powder separated in the precipitator 66 is returned to any suitable point in the system. As illustrated, this powder is shown discharging through line 67 in to the oil line 4. If desired, a portion of the regeneration gas may be first cooled before being introduced into the stripping chamber 27. In the latter case, a portion of the gas passing through line 64 continues through line 68 which merges with line 28.

As a further alternative, the electrical precipitator may be omitted and final removal of the catalyst from the regeneration gas accomplished in the scrubbing tower 32. In the latter case, a main stream of regeneration gas may be passed through lines 61, 62 to line 69 which merges with line 31 carrying the stripping gas to the scrubbing tower 32. When operating in this manner, it is desirable to provide a heat exchanger 64' in the line 31 to cool the regeneration gas before introducing the same into the scrubbing tower. It may also be desirable to cool the stripping gas passing to the scrubbing tower even in cases where the main stream of regeneration gas does not pass into the scrubbing tower. Also, a portion of the regeneration gas may be passed through lines 61, heat exchanger 63, and thence directly to the scrubbing tower through lines 64, 71, 69 and 31.

This case is filed as a continuation-in-part of my application Serial No. 501,740, filed September 10, 1943.

Having described the preferred embodiment, it will be understood that the invention embraces other variations and modifications as set forth in the accompanying claims.

I claim:

1. A process for the conversion of hydrocarbon oils which comprises passing the oil to be converted in vapor form through a conversion zone containing a subdivided conversion catalyst, removing gaseous conversion products containing entrained catalyst particles from the conversion zone, partially condensing the conversion products so withdrawn to form an initial condensate containing said entrained catalyst, separating said initial condensate from the remaining oil vapors, continuously withdrawing a stream of catalyst containing vaporizable hydrocarbons from the conversion zone, passing the catalyst so withdrawn into a stripping zone, passing a stripping gas through said stripping zone in contact with said catalyst to remove vaporizable constituents from the catalyst therein, removing stripping gas containing entrained catalyst and hydrocarbon vapors from the stripping zone, passing the stripping gas so removed in contact with said first named condensate after separation from the remaining oil vapors to remove entrained catalyst contained in stripping gas.

2. A process for the conversion of hydrocarbon oils which comprises passing the oil to be converted through a conversion zone containing a conversion catalyst in subdivided form, withdrawing gaseous conversion products containing entrained catalyst from the conversion zone, partially condensing the gaseous conversion products so withdrawn to form an initial condensate containing said entrained catalyst, separating said initial condensate from the remaining oil vapors, separately withdrawing the catalyst containing vaporizable hydrocarbons and combustible solid deposits from the conversion zone, passing a stripping gas in contact with the catalyst so withdrawn to remove said vaporizable constituents, thereafter passing the stripping gas containing said constituents in contact with said first named initial condensate containing said entrained catalyst after separation from said remaining oil vapors, passing an oxidizing gas in contact with the catalyst so stripped to burn combustible deposits remaining thereon, returning the catalyst so regenerated to the conversion zone and utilizing at least a portion of the products resulting from the burning of said combustible deposits as said first named stripping gas.

3. A process for the conversion of hydrocarbon oils which comprises passing the oil to be converted in vapor form upwardly through a conversion zone containing a layer of finely divided conversion catalyst, controlling the velocity of the oil vapors passing upwardly through said zone to maintain said layer of catalyst in a fluidized turbulent condition, continuously removing the gaseous conversion products from said conversion zone, cooling the gaseous conversion products so withdrawn to form an initial condensate containing said entrained catalyst, separating said initial condensate from the remaining oil vapors, removing catalyst containing vaporizable hydrocarbon constituents and solid combustible deposits from the conversion zone, passing the catalyst so withdrawn into a stripping zone, passing a stripping gas upwardly through said stripping zone in contact with said catalyst at a velocity controlled to maintain a dense turbulent layer of catalyst within said stripping zone, removing stripping gas containing entrained catalyst and vaporizable hydrocarbons from the stripping zone, and passing the stripping gas so removed in contact with said initial condensate containing said first named entrained catalyst.

4. The process defined by claim 3 wherein the catalyst is continuously withdrawn from the stripping zone and passed to a regenerating zone wherein the catalyst is regenerated by an oxidizing gas to remove combustible deposits and the regenerated catalyst is returned to the conversion zone.

5. A process for the conversion of hydrocarbon oils which comprises passing a stream of said oil in vapor form through a conversion zone maintained at conversion temperature, contacting said oil within said conversion zone with a finely divided conversion catalyst for a period sufficient to obtain the desired conversion thereof, thereafter removing vaporous conversion products containing entrained catalyst particles from said conversion zone, partially condensing said vaporous conversion products to form an initial condensate containing the entrained catalyst particles therein, separating the initial condensate from the remaining oil vapors, continuously removing a stream of finely divided catalyst from said conversion zone, continuously introducing a stream of catalyst into said conversion zone to replace that withdrawn therefrom, contacting the stream of catalyst removed from said conversion zone with a stripping gas in a zone separate and independent from said conversion zone to remove vaporizable hydrocarbon constituents therefrom, removing stripping gas containing entrained catalyst particles from the stripping zone, and passing the stripping gas so removed in contact with said initial condensate after separation from the remainder of said oil vapors to remove entrained catalyst from said stripping gas.

6. A process for the conversion of hydrocarbon oils which comprises passing the oil to be converted through a conversion zone containing a conversion catalyst in finely divided state, maintaining the oil in vapor form within the conversion zone at active conversion temperature for a period sufficient to obtain the desired conversion thereof, thereafter removing vaporous conversion products from said conversion zone, continuously removing finely divided catalyst containing vaporizable constituents from said conversion zone, passing a stream of stripping gas in contact with said catalyst so removed in a separate stripping zone to separate vaporizable hydrocarbon constituents therefrom, removing stripping gas containing entrained solid particles of catalyst from said stripping zone, maintaining said stripping gas removed from said stripping zone segregated from said vaporous conversion products, contacting said stripping gas with a liquid and in the absence of said vaporous conversion products to remove entrained solid particles of catalyst from said stripping gas, passing the stripped catalyst to a regenerating zone, passing a regenerating gas containing free oxygen in contact with said catalyst within said regenerating zone to burn combustible deposits from said catalyst, returning regenerated catalyst to said conversion zone, removing combustion gases containing entrained catalyst from said regenerating zone, passing at least a portion of said regenerating gas so removed into said stripping zone as said stream of stripping gas, cooling another portion of said regenerating gas, and passing it into said liquid.

7. A process for the conversion of hydrocarbon oils which comprises passing the oil to be converted in vapor form through a conversion zone containing a body of conversion catalyst in powder form, contacting said oil vapors with said catalyst powder within said conversion zone at a temperature and for a period sufficient to obtain the desired conversion thereof, separating the bulk of the catalyst powder from the vaporous conversion products prior to condensation thereof, thereafter partially condensing the vaporous products to form an initial condensate containing catalyst powder entrained in said vapors, separating said initial condensate from the remainder of said oil vapors, removing catalyst powder containing combustible deposits from said conversion zone, passing the catalyst so removed to a regenerating zone, intermixing the catalyst within said regenerating zone with a regenerating gas containing free oxygen to burn combustible deposits therefrom, thereafter separating the bulk of the powder from the regenerating gas, returning the regenerated catalyst to the conversion zone, withdrawing combustion gases containing entrained catalyst from the regenerating zone, and passing at least a portion of the regenerating gas so withdrawn in contact with said initial condensate so separated from the remainder of said oil vapors to remove entrained catalyst particles therefrom.

8. A process for the conversion of hydrocarbon oils which comprises passing the oil to be converted in vapor form through a conversion zone containing a body of conversion catalyst in powder form, contacting said oil vapors with said catalyst powder within said conversion zone at a temperature and for a period sufficient to obtain the desired conversion thereof, separating the bulk of the catalyst powder from the vaporous conversion products prior to condensation thereof, thereafter partially condensing vaporous conversion products to form an initial condensate containing catalyst powder entrained in said vapors, separating said initial condensate from the remainder of said oil vapors, removing catalyst powder containing combustible deposits from the conversion zone, passing a stripping gas of a composition hereinafter specified in contact with said catalyst so removed in a separate stripping zone to separate vaporizable constituents from said catalyst, removing stripping gas containing entrained catalyst from said stripping zone, passing the stripping gas so removed into a scrubbing zone, scrubbing the stripping gas within said scrubbing zone with said initial condensate to remove entrained catalyst from said stripping gas, passing stripped catalyst from said stripping zone to a regenerating zone, intermixing the catalyst within said regenerating zone with a regenerating gas containing free oxygen to burn combustible deposits from said catalyst, thereafter separating the bulk of the catalyst powder from the combustion gases, returning the regenerated catalyst to the conversion zone, withdrawing combustion gases containing entrained catalyst from the regenerating zone, passing a portion of the combustion gases so withdrawn to said stripping zone as a stripping gas therefor, and passing at least a portion of the remainder of said combustion gases removed from said regenerating zone to said scrubbing zone.

9. A method for the conversion of hydrocarbon oils which comprises introducing subdivided catalyst material and hydrocarbon oil into a conversion zone maintained at conversion temperature, maintaining the catalyst particles as a dense fluidized liquid-simulating mixture in said conversion zone by controlling the velocity of the upflowing hydrocarbon vapors therein, withdrawing vaporous conversion products overhead from said conversion zone, withdrawing dense fluidized fouled catalyst particles containing hydrocarbon constituents from the lower portion of said conversion zone as a confined stream and passing such confined stream into a separate and independent stripping zone below the level of a fluidized dense liquid-simulating catalyst mixture therein produced as hereafter set forth, introducing stripping gas into the bottom portion of said stripping zone at a velocity selected to maintain the particles in a dense fluidized liquid-simulating condition in said stripping zone during stripping, removing stripped particles from the bottom portion of said stripping zone in a dense fluidized condition, removing stripping gas and stripped-out constituents from the upper portion of said stripping zone as a separate stream and maintaining said stream separate from the vaporous conversion products withdrawn from said conversion zone.

10. The process as defined in claim 9 wherein the separate and confined stream of stripping gas and stripped-out constituents is withdrawn from the upper portion of the stripping zone from above the level of dense, fluidized catalyst particles therein.

11. The process as defined in claim 9 wherein the entrained catalyst particles are removed from the separate and confined stream of stripping gas and stripped-out constituents.

ALEXIS VOORHIES, JR.

REFERENCES CITED

The following references are of record in the file of this patent:

UNITED STATES PATENTS

| Number | Name | Date |
|---|---|---|
| 2,327,175 | Conn | Aug. 17, 1943 |
| 2,344,900 | Reeves et al. | Mar. 21, 1944 |